(12) United States Patent
Woodruff et al.

(10) Patent No.: US 12,481,751 B2
(45) Date of Patent: Nov. 25, 2025

(54) PROVISIONING CONTROL APPARATUS AND METHOD FOR PROVISIONING ELECTRONIC DEVICES

(71) Applicant: Secure Thingz Ltd., Cambridge (GB)

(72) Inventors: Tim Woodruff, Cambridge (GB); Peter Dunne, Huntingdon (GB)

( * ) Notice: Subject to any disclaimer, the term of this patent is extended or adjusted under 35 U.S.C. 154(b) by 498 days.

(21) Appl. No.: 17/696,074

(22) Filed: Mar. 16, 2022

(65) Prior Publication Data
US 2022/0300605 A1 Sep. 22, 2022

(30) Foreign Application Priority Data
Mar. 17, 2021 (EP) .................................. 21163096

(51) Int. Cl.
| G06F 21/53 | (2013.01) |
| G06F 21/51 | (2013.01) |
| G06F 21/60 | (2013.01) |
| G06F 21/62 | (2013.01) |
| G06F 21/74 | (2013.01) |

(52) U.S. Cl.
CPC .............. *G06F 21/53* (2013.01); *G06F 21/51* (2013.01); *G06F 21/602* (2013.01); *G06F 21/6227* (2013.01); *G06F 21/74* (2013.01)

(58) Field of Classification Search
CPC ........ G06F 21/53; G06F 21/51; G06F 21/602; G06F 21/6227; G06F 21/74; G06F 21/57; G06F 21/64; H04L 9/0891
See application file for complete search history.

(56) References Cited

U.S. PATENT DOCUMENTS

| 9,276,752 | B2 * | 3/2016 | Abraham | .................. H04L 9/32 |
| 9,674,162 | B1 | 6/2017 | Miller et al. | |
| 9,893,885 | B1 * | 2/2018 | Miller | ................... H04L 9/0891 |
| 11,475,140 | B1 * | 10/2022 | Buonora | ............... G06F 21/602 |
| 2004/0127196 | A1 * | 7/2004 | Dabbish | .............. G06F 21/1011 |
| | | | | 380/247 |
| 2013/0046981 | A1 | 2/2013 | Ducharme et al. | |

(Continued)

FOREIGN PATENT DOCUMENTS

WO 2017/027532 A1 2/2017

OTHER PUBLICATIONS

Extended Search Report from corresponding EP Application No. 21163096.7, Aug. 11, 2021.

*Primary Examiner* — Patrice L Winder

(57) ABSTRACT

A provisioning control apparatus is arranged to be coupled to a provisioning equipment server electrically connectable with at least one electronic device for provisioning the electronic device with security sensitive provisioning data. The electronic device includes a processor, a volatile memory and a non-volatile memory. The provisioning control apparatus has a communication interface configured to securely provide a provisioning application code to the provisioning equipment server for storing the provisioning application code in the volatile memory of the electronic device. The provisioning control apparatus includes a processor configured to trigger the processor of the electronic device to execute the provisioning application code. The provisioning application code is arranged, when being executed by the processor of the electronic device, to store the security sensitive provisioning data in the non-volatile memory of the electronic device.

23 Claims, 3 Drawing Sheets

(56) References Cited

U.S. PATENT DOCUMENTS

| | | | |
|---|---|---|---|
| 2017/0338966 A1* | 11/2017 | Li | H04L 9/3247 |
| 2018/0316511 A1* | 11/2018 | Meyer | G06F 9/45558 |
| 2018/0375665 A1* | 12/2018 | Contenti | G01G 19/44 |
| 2020/0012803 A1* | 1/2020 | Mannan | G06F 21/6218 |
| 2020/0304299 A1* | 9/2020 | Medvinsky | H04L 9/0844 |
| 2020/0356701 A1* | 11/2020 | Pruss | G06F 21/78 |
| 2020/0380585 A1* | 12/2020 | Hare | G06Q 20/321 |
| 2021/0126946 A1* | 4/2021 | Chou | G06F 21/72 |

* cited by examiner

PROVISIONING CONTROL APPARATUS AND METHOD FOR PROVISIONING ELECTRONIC DEVICES

TECHNICAL FIELD

The invention relates to the secure production and provisioning of electronic devices or components of electronic devices. More specifically, the invention relates to an apparatus and method for provisioning electronic devices or components of electronic devices.

BACKGROUND OF THE INVENTION

The production and assembly of state-of-the-art electronic devices, such as smartphones, tablet computers as well as other types of electronic consumer or IoT devices, often happens in a distributed fashion in that the various electronic components, including the electronic chips or microprocessors of an electronic consumer device are manufactured, provisioned or personalized and finally assembled at different locations and by different parties. For instance, an electronic chip or microprocessor for an electronic device may be originally manufactured by a chip manufacturer and provisioned by another party with security sensitive provisioning data, such as cryptographic keys and/or a firmware, before being assembled into the final end product by the manufacturer of the electronic device, e.g., an OEM. A similar problem may arise in In-system programming (ISP), also called in-circuit serial programming (ICSP), where electronic components may be programmed, i.e., provided with security sensitive provisioning data, while already installed in an electronic device, rather than requiring the electronic component, e.g., chip, to be programmed prior to installing it into the electronic device.

Thus, there is a need for apparatuses and methods for securely provisioning electronic devices or components, such as chips or microprocessors, for electronic devices.

SUMMARY OF THE INVENTION

It is therefore an object of the invention to provide apparatuses and methods allowing for securely provisioning electronic devices or components, such as chips or microprocessors, for electronic devices.

The foregoing and other objects are achieved by the subject matter of the independent claims. Further implementation forms are apparent from the dependent claims, the description and the figures.

According to a first aspect a provisioning control apparatus is configured to be coupled to a provisioning equipment server, wherein the provisioning equipment server is electrically connectable with at least one electronic device or component for provisioning the electronic device with security sensitive provisioning data. The electronic device comprises a processor, a volatile memory, e.g., a RAM, and a non-volatile memory, e.g., a Flash memory. The electronic device may be a component to be or already installed in an electronic end product.

The provisioning control apparatus comprises a communication interface configured to securely provide a provisioning application code to the provisioning equipment server for storing the provisioning application code in the volatile memory of the electronic device.

Moreover, the provisioning control apparatus comprises a processor configured to trigger, i.e., instruct the processor of the electronic component to execute the provisioning application code stored in the volatile memory of the electronic device. The provisioning application code is configured, when being executed by the processor of the electronic device, to store the security sensitive provisioning data in a secure portion of the non-volatile memory of the electronic device.

In an embodiment, the communication interface is further configured to receive the provisioning application code from a remote server.

In an embodiment, the communication interface is further configured to receive the provisioning application code from the remote server in encrypted form, wherein the processor is configured to decrypt the encrypted provisioning application code.

In an embodiment, the processor of the provisioning control apparatus is configured to generate the provisioning application code.

In an embodiment, the processor of the provisioning control apparatus is configured to include the security sensitive provisioning data in the provisioning application code.

In an embodiment, the provisioning application code is configured, when being executed, to instruct the processor of the electronic device to remove the provisioning application code from the volatile memory of the electronic device.

In an embodiment, the security sensitive provisioning data comprises electronic keys, electronic key certificates and/or configuration data, in particular one or more register settings of the processor of the electronic device.

In an embodiment, the electronic device further comprises a hardware security enclave, wherein the provisioning application code is configured, when being executed, to store at least a portion of the security sensitive provisioning data in the hardware security enclave of the electronic device. It may also set an initial configuration of the hardware security enclave. In a further embodiment, the hardware security enclave may be a separate physical device permanently connected to the electronic device.

In an embodiment, the provisioning application code comprises a least a portion of the security sensitive provisioning data to be stored in the secure portion of the non-volatile memory of the electronic device. In other words, at least a portion of the security sensitive provisioning data may be hard-coded into the provisioning application code.

In an embodiment, the communication interface is further configured to provide at least a portion of the security sensitive provisioning data, for instance, in the form of a table separately from the provisioning application code to the provisioning equipment server for storing at least the portion of the security sensitive provisioning data separately from the provisioning application code in the volatile memory of the electronic device. The provisioning application may be configured, when executed, to obtain at least the portion of the security sensitive provisioning data, e.g., the table from the volatile memory of the electronic device and to store at least the portion of the security sensitive provisioning data in the non-volatile memory of the electronic device.

In an embodiment, when executed, the provisioning application code is configured to establish a secure communication channel between the provisioning control apparatus and the electronic device, wherein the communication interface is configured to provide at least a portion of the security sensitive provisioning data via the secure communication channel to the electronic device for storing at least the portion of the security sensitive provisioning data in the secure portion of the non-volatile memory of the electronic device.

In an embodiment, the processor is configured to generate at least the portion of the security sensitive provisioning data provided via the secure communication channel to the electronic device for storing at least the portion of the security sensitive provisioning data in the secure portion of the non-volatile memory of the electronic device.

In an embodiment, the communication interface is configured to provide at least the portion of the security sensitive provisioning data together with one or more random nonce values via the secure communication channel to the electronic device for avoiding replay attacks.

In an embodiment, the electronic device further comprises a random number generator, in particular a hardware random number generator, wherein, when executed, the provisioning application code is configured to generate at least a portion of the security sensitive provisioning data, in particular one or more electronic keys, using the random number generator based on one or more seed values.

In an embodiment, the provisioning application code comprises the one or more seed values. Additionally, or alternatively, when executed, the provisioning application code may be configured to obtain the one or more seed values from the provisioning control apparatus.

In an embodiment, when executed, the provisioning application code is configured to store the security sensitive provisioning data in a pre-defined secure portion of the non-volatile memory of the electronic device.

In an embodiment, when executed, the provisioning application code is configured to provide information about storage locations, i.e. metadata of the security sensitive provisioning data in the non-volatile memory of the electronic device to the provisioning control apparatus, wherein the communication interface is configured to provide the information about storage locations of the security sensitive provisioning data in the non-volatile memory of the electronic device to the provisioning equipment server for storing the information about storage locations of the security sensitive provisioning data in the non-volatile memory of the electronic device.

In an embodiment, when executed, the provisioning application code is configured to store information about storage locations of the security sensitive provisioning data in the non-volatile memory of the electronic device in a pre-defined portion of the non-volatile memory of the electronic device.

In an embodiment, the communication interface is further configured to receive information about a status, or a result of the provisioning application code being executed by the processor of the electronic device.

In an embodiment, when executed, the provisioning application code is configured to generate a public and private key pair for generating at least a portion of the security sensitive provisioning data, wherein the communication interface is configured to receive the public key of the public and private key pair from the electronic device.

In an embodiment, the processor is further configured to generate a key certificate on the basis of the public key of the public and private key pair, wherein the communication interface is configured to provide the key certificate to the provisioning equipment server for storing the key certificate in the non-volatile memory of the electronic device.

In an embodiment, when executed, the processing application code is further configured to disable or restrict a function of one or more hardware elements of the electronic device, in particular a debugging function of a communication interface of the electronic device. Disabling or restricting a debugging function of the electronic device allows storage of keys in secure areas of memory. This is because usually the debugging function has access to all memory portions, so it is important that it is disabled from accessing the keys once the device is production quality. Restriction of debugging may be implemented, for example, by using a secret passcode that would only be given to authorized debuggers.

According to a second aspect a provisioning system is provided, comprising a provisioning control apparatus according to the first aspect and a provisioning equipment server being electrically connectable with at least one electronic device for provisioning the electronic device with security sensitive provisioning data.

According to a third aspect a method is provided for provisioning at least one electronic device with security sensitive provisioning data by a provisioning control apparatus configured to be coupled to a provisioning equipment server, the provisioning equipment server being electrically connectable with the electronic device, the electronic device comprising a processor, a volatile memory and a non-volatile memory, wherein the method comprises:

securely providing a provisioning application code to the provisioning equipment server for storing the provisioning application code in the volatile memory of the electronic device; and triggering the processor of the electronic device to execute the provisioning application code, wherein the provisioning application code is configured, when being executed by the processor of the electronic device, to store the security sensitive provisioning data in the non-volatile memory of the electronic device.

The provisioning method according to the third aspect of the invention can be performed by the provisioning control apparatus according to the first aspect of the invention. Further features of the provisioning method according to the third aspect of the invention result directly from the functionality of the provisioning control apparatus according to the first aspect of the invention and its different implementation forms described above and below.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized, and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
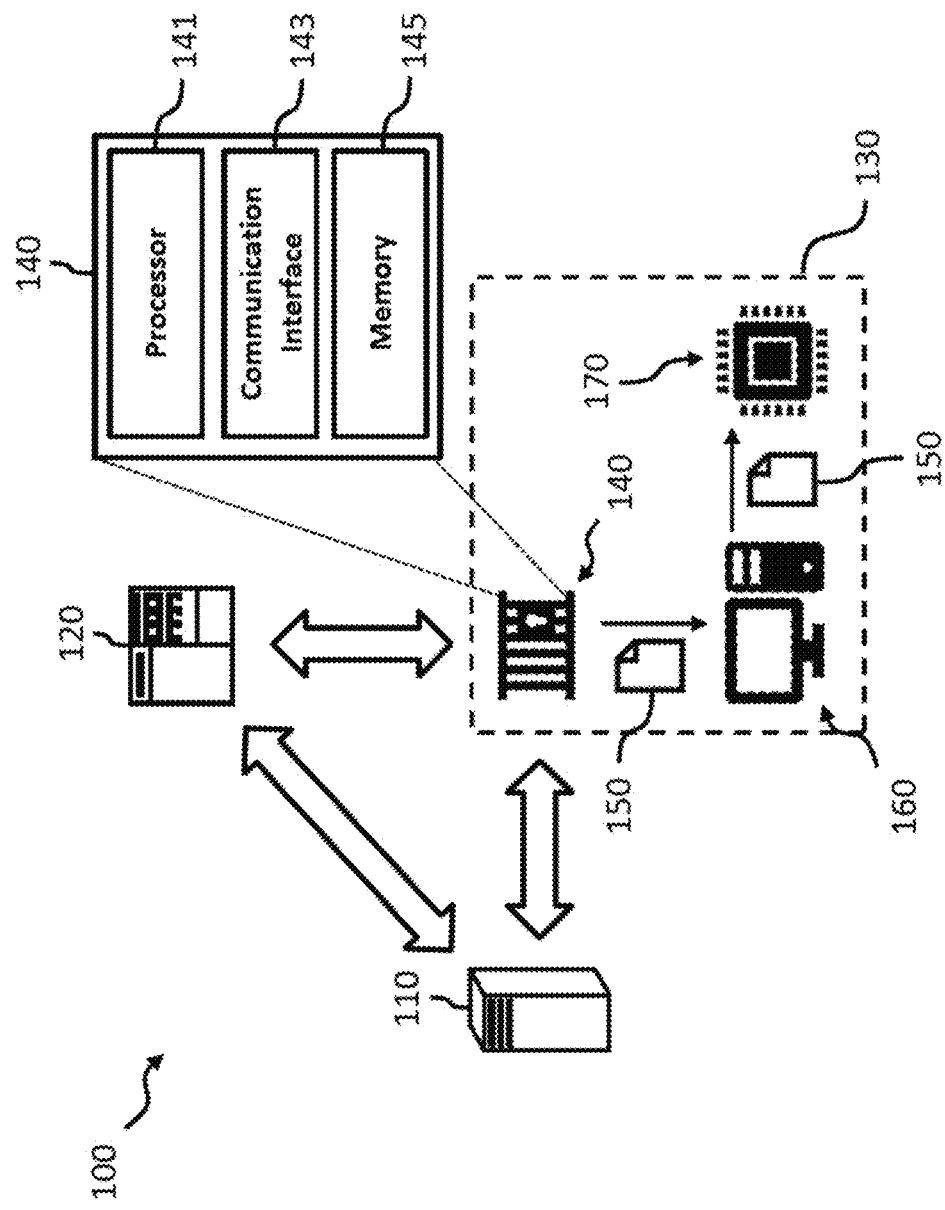
FIG. 1 shows a schematic diagram illustrating a provisioning system including a provisioning control apparatus according to an embodiment of the invention.

FIG. 1 shows a schematic diagram of a provisioning system 100 according to an embodiment of the invention, including a provisioning control apparatus 140 according to an embodiment of the invention. As will be described in more detail further below, the provisioning system 100 may comprise in addition to the provisioning control apparatus 140 a remote server 110, a security server 120 and a provisioning equipment server 160 for provisioning or personalizing electronic devices or components 170 thereof, such as chips or microprocessors 170 with security sensitive provisioning data, such as electronic keys, certificates and/or configuration data. As illustrated in FIG. 1, the provisioning control apparatus 140, the remote server 110 and the security server 120 may be configured to communicate with each other via a communication network, such as the Internet. Thus, the provisioning control apparatus 140, the remote server 110 and the security server 120 may be at different locations and under the control of different parties. As illustrated in FIG. 1, the provisioning control apparatus 140 and the provisioning equipment server 160 may be located within a production environment 130, such as a personalization factory 130. In an embodiment, the remote server 110 may be under the control or associated with an electronic equipment manufacturer, e.g., an OEM, wherein the electronic equipment manufacturer assembles electronic equipment, such as smartphones, tablet computers or other types of IoT or electronic consumer equipment, using the electronic devices or components 170 provisioned by the provisioning equipment server 160 with the security sensitive provisioning data.

In an embodiment, the provisioning control apparatus 140, the remote server 110 and the security server 120 are configured to securely communicate with each other using one or more cryptographic schemes, such as a public key infrastructure and/or a hybrid cryptographic scheme. In an embodiment, the provisioning control apparatus 140 may be under the remote control of the security server 120.

The provisioning control apparatus 140 is configured to be coupled to the provisioning equipment server 160, for instance, by a wired or a wireless connection. In an embodiment, the provisioning equipment server 160 may be implemented as a personal computer and the provisioning control apparatus 140 may be implemented as a PC card inserted in the provisioning equipment server 160. The provisioning equipment server 160 may comprise an electrical and/or mechanical interface for interacting directly or indirectly via a provisioning equipment with the electronic devices or components 170. For instance, the provisioning equipment server 160 may comprise a personalization tray for personalizing a batch of electronic devices or components 170 inserted therein.

In the embodiment illustrated in FIG. 1 the provisioning control apparatus 140 comprises a processor 141, a communication interface 143 and a non-transient memory 145. As will be described in more detail in the following under further reference to FIG. 2, the communication interface 143 of the provisioning control apparatus 140 is configured to securely provide a provisioning application code 150 to the provisioning equipment server 160 for storing the provisioning application code 150 in a volatile memory, e.g., a RAM 175 of the electronic device 170. Moreover, the processor 141 of the provisioning control apparatus 140 is configured to trigger a processor 171 of the electronic device 170 to execute the provisioning application code 150, wherein the provisioning application code 150 is configured, when being executed by the processor 171 of the electronic device 170, to store the security sensitive provisioning data in a non-volatile memory, e.g., a Flash memory 177 of the electronic device 170.

In an embodiment, the communication interface 143 of the provisioning control apparatus 140 is further configured to receive the provisioning application code 150 from the remote security server 120.

In an embodiment, the communication interface 143 of the provisioning control apparatus 140 is further configured to receive the provisioning application code 150 from the remote security server 120 in encrypted form, wherein the processor 141 of the provisioning control apparatus 140 is configured to decrypt the encrypted provisioning application code 150.

In an embodiment, the processor 141 of the provisioning control apparatus 140 is configured to generate at least a portion of the provisioning application code 150.

In an embodiment, the processor 141 of the provisioning control apparatus 140 is configured to include the security sensitive provisioning data in the provisioning application code 150.

In an embodiment, the provisioning application code 150 is configured, when being executed, to instruct the processor 171 of the electronic device 170 to remove the provisioning application code 150 from the volatile memory 175 of the electronic device 170. For instance, the provisioning application code 150 may be removed from the volatile memory 175 of the electronic device 170 by simply switching the electronic device 170 off, or it may modify itself once it is complete so that it cannot be executed a second time by accident (then when the RAM 175 is removed it will disappear).

In an embodiment, the security sensitive provisioning data comprises electronic keys, electronic key certificates and/or configuration data, in particular register settings.

Figure 2:
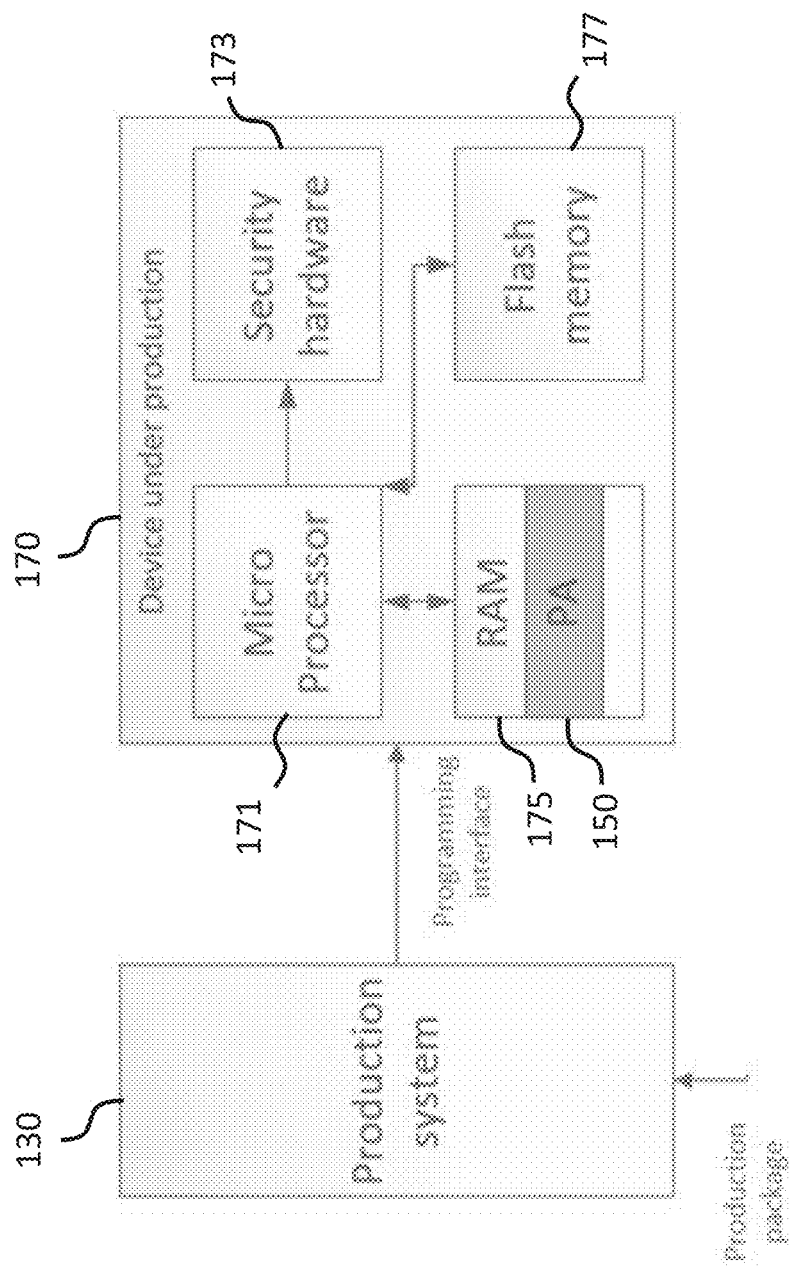
FIG. 2 shows a schematic diagram illustrating in more detail an exemplary architecture of an electronic component provisioned by a provisioning control apparatus according to an embodiment.

In an embodiment, as illustrated in FIG. 2, the electronic device 170 further comprises a hardware security enclave 173. The hardware security enclave 173 of the electronic device 170 may comprise or be similar to the security enclave processor as disclosed in U.S. Pat. No. 8,832,465, which is herein fully incorporated by reference. The provisioning application code 150 is configured, when being executed, to store at least a portion of the security sensitive provisioning data in the hardware security enclave 173 of the electronic device 170. This may include initial configuration of the security enclave 173. In a further embodiment, the hardware security enclave 173 may be a separate physical device connected to the electronic device 170.

In an embodiment, the provisioning application code comprises a least a portion of the security sensitive provisioning data to be stored in the non-volatile memory of the electronic device.

In an embodiment, the communication interface 143 of the provisioning control apparatus 140 is further configured to provide at least a portion of the security sensitive provisioning data separately from the provisioning application code to the provisioning equipment server for storing at least the portion of the security sensitive provisioning data separately from the provisioning application code 150 in the volatile memory 175 of the electronic device 170, wherein the provisioning application code 150 is configured, when executed, to obtain at least the portion of the security sensitive provisioning data from the volatile memory 175 of the electronic device 170 and to store at least the portion of the security sensitive provisioning data in the non-volatile memory 177 of the electronic device 170.

In an embodiment, when executed, the provisioning application code 150 is configured to establish a secure communication channel between the provisioning control apparatus 140 and the electronic device 170, wherein the communication interface 143 is configured to provide at least a portion of the security sensitive provisioning data via the secure communication channel to the electronic device 170 for storing at least the portion of the security sensitive provisioning data in the non-volatile memory 177 of the electronic device 170.

In an embodiment, the processor 141 of the provisioning control apparatus 140 is configured to generate at least the portion of the security sensitive provisioning data provided via the secure communication channel to the electronic device 170 for storing at least the portion of the security sensitive provisioning data in the non-volatile memory 177 of the electronic device 170.

In an embodiment, the communication interface 143 of the provisioning control apparatus 140 is configured to provide at least the portion of the security sensitive provisioning data together with one or more random nonce values via the secure communication channel to the electronic device 170 in order to avoid replay attacks.

In an embodiment, the electronic device 170 may further comprise a random number generator, in particular a hardware random number generator, wherein, when being executed, the provisioning application code 150 is configured to generate at least a portion of the security sensitive provisioning data using the random number generator based on one or more seed values. In an embodiment, the provisioning application code 150 may comprise the one or more seed values. Alternatively, when executed, the provisioning application code may be configured to obtain the one or more seed values from the provisioning control apparatus 140.

In an embodiment, when being executed, the provisioning application code 150 is configured to store the security sensitive provisioning data in a pre-defined secure portion of the non-volatile memory 177 of the electronic device 170. In an embodiment, when being executed, the provisioning application code 150 is configured to provide metadata including information about storage locations of the security sensitive provisioning data in the non-volatile memory 177 of the electronic device 170 to the provisioning control apparatus 140, wherein the communication interface 143 is configured to provide the information about storage locations of the security sensitive provisioning data in the non-volatile memory 177 of the electronic device 170 to the provisioning equipment server 160 for storing the information about storage locations of the security sensitive provisioning data in the non-volatile memory 177 of the electronic device 170.

In an embodiment, when being executed, the provisioning application code 150 is configured to store the metadata including information about storage locations of the security sensitive provisioning data in the non-volatile memory 177 of the electronic device 170 in a pre-defined portion, e.g., in a pre-defined address range of the non-volatile memory 177 of the electronic device 170.

In an embodiment, the communication interface 143 of the provisioning control apparatus 140 is further configured to receive information about a status or a result of the provisioning application code 150 being executed by the processor 171 of the electronic device 170. For instance, the provisioning application code 150 may send an acknowledgment message to the communication interface 143 of the provisioning control apparatus 140, if it has been successfully executed.

In an embodiment, when executed, the provisioning application code 150 is configured to generate a public and private key pair for generating at least a portion of the security sensitive provisioning data, wherein the communication interface 143 of the provisioning control apparatus 140 is configured to receive the public key of the public and private key pair from the electronic device 170.

In an embodiment, the processor 141 of the provisioning control apparatus 140 is further configured to generate a key certificate on the basis of the public key of the public and private key pair, wherein the communication interface 143 of the provisioning control apparatus 140 is configured to provide the key certificate to the provisioning equipment server 160 for storing the key certificate in the non-volatile memory 177 of the electronic device 170.

In an embodiment, when executed, the processing application code 150 is further configured to disable or at least restrict a function or functionality of one or more hardware elements of the electronic device 170, in particular a debugging function of a communication interface of the electronic device 170. Disabling or restricting a debugging function of the electronic device allows storage of keys in secure areas of memory. This is because usually the debugging function has access to all memory portions, so it is important that it is disabled or restricted from accessing the keys once the device is production quality. Restriction of debugging may be implemented, for example, by using a secret passcode that would only be given to authorized debuggers.

In an embodiment, a portion of the provisioning application code 150 may be specific for the device type and potentially part data that may be general and part data that may be specific to the device identity. In an embodiment, the provisioning application code 150 may be generic with configuration data for a particular chip as it is likely to have registers in different addresses and potentially with different register structure and commands. If the provisioning application code 150 includes the keys for the electronic device 170 device, it would be individual for the specific device 170. If the provisioning application code 150 causes keys to be created inside the electronic device 170, it may not need to be specific to the specific device 170, and a generic provisioning application code 150 may be used for that device type, and potentially multiple device types.

Figure 3:
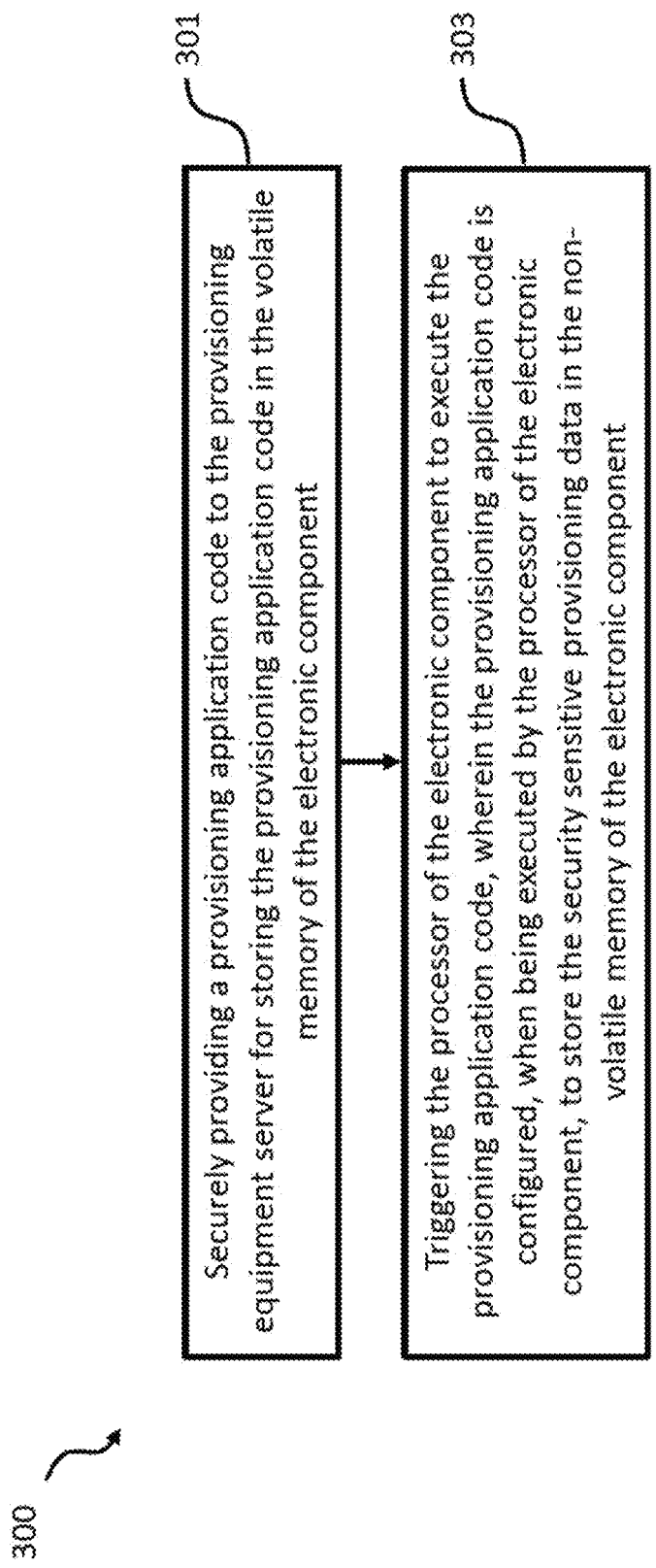
FIG. 3 shows a flow diagram illustrating steps of a provisioning method according to an embodiment of the invention.

FIG. 3 shows a flow diagram illustrating steps of a provisioning method 300 according to an embodiment of the invention. The method 300 comprises the steps of:

securely providing 301 the provisioning application code 150 to the provisioning equipment server 160 for storing the provisioning application code 150 in the volatile memory 175 of the electronic component 170; and triggering 303 the processor 171 of the electronic component 170 to execute the provisioning application code 150, wherein the provisioning application code 150 is configured, when being executed by the processor 171 of the electronic component 170, to store the security sensitive provisioning data in the non-volatile memory 177 of the electronic component 170.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g.," are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A provisioning control apparatus configured to be coupled to a provisioning equipment server, the provisioning equipment server being electrically connectable with at least one electronic device for provisioning the electronic device with security sensitive provisioning data, the electronic device comprising a processor, a volatile memory and a non-volatile memory, wherein the provisioning control apparatus comprises:

a communication interface configured to securely provide a provisioning application code to the provisioning equipment server for storing the provisioning application code in the volatile memory of the electronic device; and a processor configured to trigger the processor of the electronic device by instructing the processor of the electronic device to execute the provisioning application code, wherein the provisioning application code is configured, when being executed by the processor of the electronic device, to store the security sensitive provisioning data in the non-volatile memory of the electronic device, wherein, when executed, the provisioning application code is configured to generate a public and private key pair for generating at least a portion of the security sensitive provisioning data and wherein the communication interface is configured to receive the public key of the public and private key pair from the electronic device.

2. The provisioning control apparatus of claim 1, wherein the communication interface is further configured to receive the provisioning application code from a remote server.

3. The provisioning control apparatus of claim 2, wherein the communication interface is further configured to receive the provisioning application code from the remote server in encrypted form and wherein the processor of the provisioning control apparatus is configured to decrypt the encrypted provisioning application code.

4. The provisioning control apparatus of claim 1, wherein the processor of the provisioning control apparatus is configured to generate the provisioning application code.

5. The provisioning control apparatus of claim 4, wherein the processor of the provisioning control apparatus is configured to include the security sensitive provisioning data in the provisioning application code.

6. The provisioning control apparatus of claim 1, wherein the provisioning application code is configured, when being executed, to instruct the processor of the electronic device to remove the provisioning application code from the volatile memory of the electronic device.

7. The provisioning control apparatus of claim 1, wherein the security sensitive provisioning data comprises electronic keys, electronic key certificates and/or configuration data.

8. The provisioning control apparatus of claim 1, wherein the electronic device further comprises a hardware security enclave and wherein the provisioning application code is configured, when being executed, to store at least a portion of the security sensitive provisioning data in the hardware security enclave of the electronic device.

9. The provisioning control apparatus of claim 1, wherein the provisioning application code comprises a least a portion of the security sensitive provisioning data to be stored in the non-volatile memory of the electronic device.

10. The provisioning control apparatus of claim 1, wherein the communication interface is further configured to provide at least a portion of the security sensitive provisioning data separately from the provisioning application code to the provisioning equipment server for storing the at least a portion of the security sensitive provisioning data separately from the provisioning application code in the volatile memory of the electronic device and wherein the provisioning application code is configured, when executed, to obtain the at least a portion of the security sensitive provisioning data from the volatile memory of the electronic device and to store the at least a portion of the security sensitive provisioning data in the non-volatile memory of the electronic device.

11. The provisioning control apparatus of claim 1, wherein, when executed, the provisioning application code is configured to establish a secure communication channel between the provisioning control apparatus and the electronic device and wherein the communication interface is configured to provide at least a portion of the security sensitive provisioning data via the secure communication channel to the electronic device for storing the at least a portion of the security sensitive provisioning data in the non-volatile memory of the electronic device.

12. The provisioning control apparatus of claim 11, wherein the processor of the provisioning control apparatus is configured to generate the at least a portion of the security sensitive provisioning data provided via the secure communication channel to the electronic device for storing the at least a portion of the security sensitive provisioning data in the non-volatile memory of the electronic device.

13. The provisioning control apparatus claim 11, wherein the communication interface is configured to provide the at least a portion of the security sensitive provisioning data together with one or more random nonce values via the secure communication channel to the electronic device.

14. The provisioning control apparatus of claim 1, wherein the electronic device further comprises a random number generator, in particular a hardware random number generator and wherein, when executed, the provisioning application code is configured to generate at least a portion of the security sensitive provisioning data using the random number generator based on one or more seed values.

15. The provisioning control apparatus of claim 14, wherein the provisioning application code comprises the one or more seed values and/or wherein, when executed, the provisioning application code is configured to obtain the one or more seed values from the provisioning control apparatus.

16. The provisioning control apparatus of claim 1, wherein, when executed, the provisioning application code is configured to store the security sensitive provisioning data in a pre-defined secure portion of the non-volatile memory of the electronic device.

17. The provisioning control apparatus of claim 1, wherein, when executed, the provisioning application code is configured to provide information about storage locations of the security sensitive provisioning data in the non-volatile memory of the electronic device to the provisioning control apparatus and wherein the communication interface is configured to provide the information about storage locations of the security sensitive provisioning data in the non-volatile memory of the electronic device to the provisioning equipment server for storing the information about storage locations of the security sensitive provisioning data in the non-volatile memory of the electronic device.

18. The provisioning control apparatus of claim 1, wherein, when executed, the provisioning application code is configured to store information about storage locations of the security sensitive provisioning data in the non-volatile memory of the electronic device in a pre-defined portion of the non-volatile memory of the electronic device.

19. The provisioning control apparatus of claim 1, wherein the communication interface is further configured to receive information about a status, or a result of the provisioning application code being executed by the processor of the electronic device.

20. The provisioning control apparatus of claim 1, wherein the processor of the provisioning control apparatus is further configured to generate a key certificate on the basis of the public key of the public and private key pair and wherein the communication interface is configured to provide the key certificate to the provisioning equipment server for storing the key certificate in the non-volatile memory of the electronic device.

21. The provisioning control apparatus of claim 1, wherein, when executed, the processing application code is further configured to disable or restrict a function of one or more hardware elements of the electronic device, in particular a debugging function of a communication interface of the electronic device.

22. A provisioning system, comprising:
a provisioning control apparatus according to claim 1; and
a provisioning equipment server being electrically connectable with at least one electronic device for provisioning the electronic device with security sensitive provisioning data.

23. A method for provisioning at least one electronic device with security sensitive provisioning data by a provisioning control apparatus configured to be coupled to a provisioning equipment server, the provisioning equipment server being electrically connectable with the at least one electronic device, the electronic device comprising a processor, a volatile memory and a non-volatile memory, wherein the method comprises:
securely providing a provisioning application code to the provisioning equipment server for storing the provisioning application code in the volatile memory of the electronic device by a communication interface of the provisioning control apparatus; and
triggering the processor of the electronic device by instructing the processor of the electronic device to execute the provisioning application code, wherein the provisioning application code is configured, when being executed by the processor of the electronic device, to store the security sensitive provisioning data in the non-volatile memory of the electronic device,
wherein, when executed, the provisioning application code generates a public and private key pair for generating at least a portion of the security sensitive provisioning data and wherein the communication interface of the provisioning control apparatus receives the public key of the public and private key pair from the electronic device.

\* \* \* \* \*